Sept. 27, 1949.　　　J. H. MARCUM　　　2,482,922
AIRLINE INFLATING GUN
Filed Oct. 14, 1947

INVENTOR.
JAMES H. MARCUM
BY
Kwis, Hudson, Boughton & Williams
ATTORNEYS

Patented Sept. 27, 1949

2,482,922

UNITED STATES PATENT OFFICE 2,482,922

AIRLINE INFLATING GUN

James H. Marcum, Cleveland Heights, Ohio, assignor to The Dill Manufacturing Company, Cleveland, Ohio, a corporation of Ohio Application October 14, 1947, Serial No. 779,791

2 Claims. (Cl. 284—17)

This invention relates to an inflating gun which may be mounted upon the chuck of the usual air line that extends from a source of compressed air and is used at service stations, garages and the like for inflating automobile tires.

The air line at service stations, garages and the like is frequently used for inflating containers which require substantially lower air pressures than do the tires of motor vehicles. Such air lines are often used to inflate bicycle tires, air cushions and similar inflatable containers which are not designed or adapted to be inflated under high pressures and consequently such use of air lines may result in over-inflating the containers or even in damaging the same.

An object of the invention is to provide an inflating gun which can be readily applied to or removed from the chuck of the usual air line and which provides for the proper inflation of bicycle tires, air cushions and similar small inflatable containers which should not be subjected to high pressures and should only be inflated to relatively low pressures as compared to the tires of motor vehicles.

A further object of the invention is to provide an inflating gun of the type specified which can be operatively connected quickly and readily to the air chucks of air lines.

A further object is to provide an inflating gun as specified above and wherein the means for attaching the gun to the air chuck of an air line is of such character that the gun will be normally held in associated relationship with the air chuck in such manner that the valve of the air chuck remains closed but when the gun and the body of the air chuck are pressed together by the operator the air chuck valve will be opened and air may flow through the inflating gun.

Further and additional objects and advantages residing in the invention and not referred to above will become apparent during the following detailed description of an embodiment of the invention which is illustrated in the accompanying drawing wherein, Fig. 1 is a side elevational view of the inflating gun, a portion of an air line provided with an air chuck which cooperates with the gun being illustrated by dot and dash lines.

Figure 1:
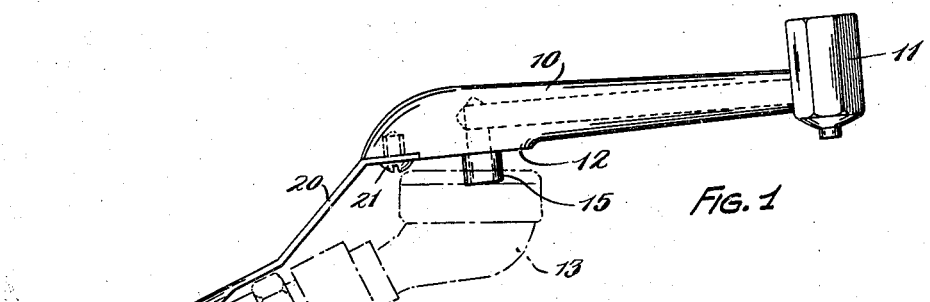

The inflating gun 10 may be readily formed from a casting and is substantially semi-cylindrical in cross section and tapers from its inner end toward its opposite end which is connected to the inflating gun chuck indicated generally at 11. The underside of the inflating gun is substantially flat and is provided with a raised portion 12 at the location where the gun is connected to the air chuck 13 of the air line 14. The raised portion 12 is provided with an integral cylindrical extension 15 through which extends a passage 16 which terminates in the body of the inflating gun. The inflating gun is provided with a passage 17 in communication with the passage 16 and extending substantially at right angles thereto and longitudinally of the gun.

The outer end of the inflating gun is threaded and tapered as indicated at 18 and the said outer end is screwed into a tapered threaded opening or counterbore in the inflating gun chuck 11, wherefore the passage 17 is in communication with the interior of said chuck 13 as will later be referred to.

The underside of the inflating gun at its rear end is provided with a flattened portion 19 against which bears the end of a spring metal attaching member 20, such end of the attaching member being secured to the gun by suitable means such as the screw 21. The attaching member 20 extends angularly from its end portion which is secured to the inflating gun and at its opposite end is transversely curved as indicated at 22 and has curved spring attaching arms 23 integrally formed thereon.

The inflating gun can be mounted on various forms of air line chucks but in order to illustrate the invention it is shown as operatively connected to an air line chuck 13 of known construction and which air line chuck is secured to the end of an air line 14 in any well-known manner while said air line will be connected with a source of compressed air as will be well understood. In other words, the air line 14 and air line chuck 13 are of the type usually found at service stations and garages for inflating motor vehicle tires.

Figure 2:
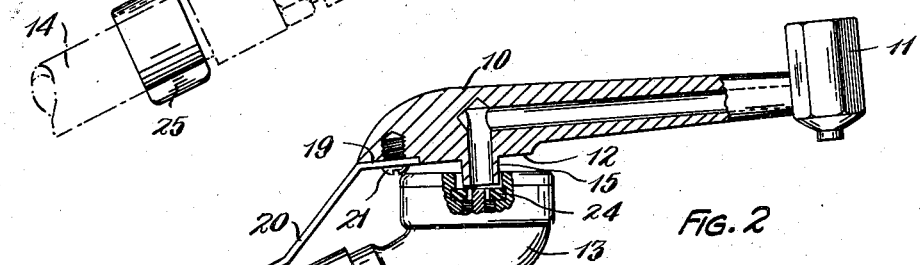
Fig. 2 is a view similar to Fig. 1 but with the air chuck and air line shown in full lines and with a certain portion of the air line chuck broken away and shown in section, while the inflating gun is illustrated in partial longitudinal vertical section, it being noted that the gun is held in position on the air line chuck in such manner as not to open the chuck valve.

The inflating gun is applied to chuck 13 as clearly shown in Figs. 1 and 2 and with the attaching member 20 extending rearwardly from the inflating gun over the air line 14 and having the attaching arms 23 embracing the air line with a spring holding action. When the inflating gun is thus mounted upon the air line chuck 13 the projection or extension 15 on the underside of the gun will be located in the opening in the chuck 13 which normally receives the nipple of a valve stem, it being noted, however, that the extension or projection 15 extends into the opening at an angle and has its edge at one side thereof lightly bearing against the air line chuck gasket 24 in such manner that the chuck valve 25 is not open at this time. The angular position of the gun with respect to the flat face of the chuck 13 is due to the angular portion of the attaching member 20 located intermediate the ends of the member and to the inherent spring resiliency in the attaching member. The position of the inflating gun just described is the one the gun will occupy when first applied to the air line and to the air line chuck.

Figure 3:
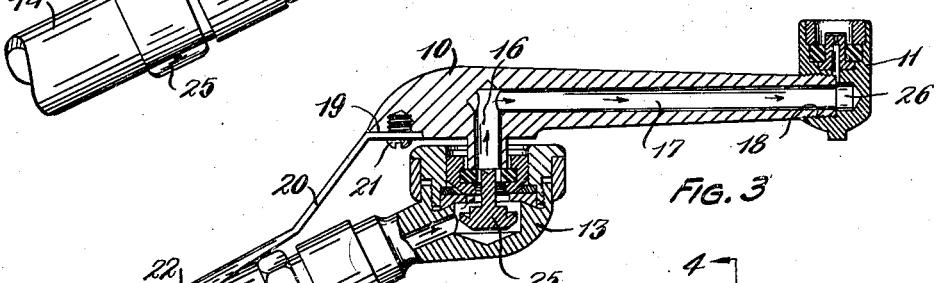
Fig. 3 is a view similar to Fig. 2 except that the air line chuck and the inflating gun are completely in section, while the gun and air line chuck have been moved into the position they assume when air is passing through the gun and the valve of the chuck is open.
Figures 4, 5:
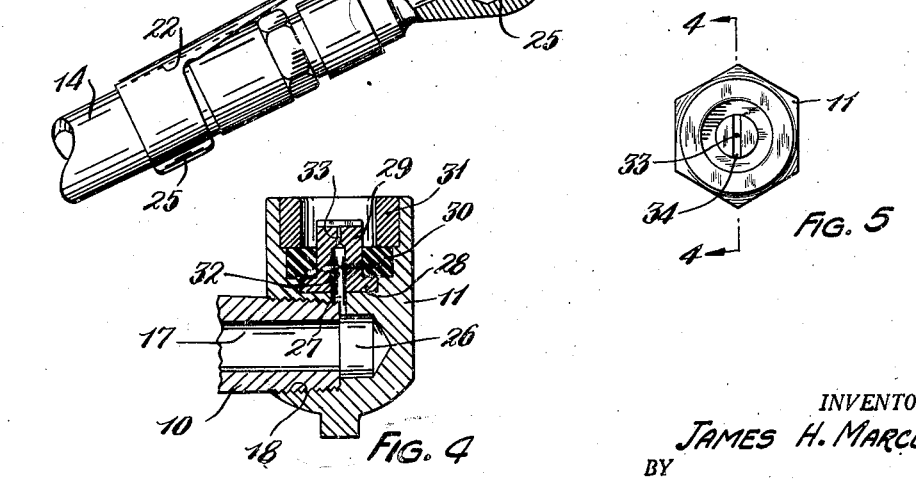
Fig. 4 is a sectional view on an enlarged scale through the chuck of the inflating gun and is taken substantially on line 4—4 of Fig. 5 looking in the direction of the arrows.
Fig. 5 is a plan view of the inflating gun chuck and is taken looking upon the end of the inflating gun chuck from above Fig. 3.

When the operator desires to use the inflating gun to inflate a bicycle tire, air cushion or other similar inflatable container which requires relatively low inflating pressures, he merely grasps the rear end of the gun and the air line chuck 13 in his hand and by applying pressure to the gun and the chuck 13 overcomes the spring action of the attaching member 20 and brings the flat underside of the gun and the flat outer face of the air line chuck 13 into substantial parallelism which movement causes the extension or projection 15 to tightly engage the chuck gasket 24 and to effect an unseating of the chuck valve 25 as will be well understood, whereupon compressed air may pass from the air line chuck 13 through the passages 16 and 17 in the gun and into the inflating gun chuck 11 mounted on the outer end of the gun. The condition just described is the one illustrated in Fig. 3 of the drawing.

The inflating gun chuck 11 is provided with a bore 26 that communicates with a tapered threaded counterbore into which screws the threaded end 18 of the inflating gun. The bore 26 in turn communicates with a passage 27 formed in the inflating gun chuck 11 and extending longitudinally thereof. The chuck 11 is provided with a bore which receives the flanged head 28 of a chuck pin 29. The chuck 11 is further provided with a counterbore which mounts the chuck gasket 30 and with another or outer counterbore which mounts a retaining ring 31 that holds the gasket 30 and the chuck pin 29 in position, it being understood that the ring 31 may be secured in its counterbore by having a pressed fit therein or by being threaded and screwed into threads formed in the counterbore or by any other suitable securing means.

The pin 29 of the chuck 11 extends outwardly of the chuck gasket 30 and centrally into the counterbore in which the retaining ring 31 is mounted. The pin 29 is provided with a bore 32 extending longitudinally and centrally of the pin and aligned with the passage 27 in the chuck body and illustrated as of substantially the same diameter as said passage. The bore 32 in the chuck pin 29 communicates at its outer end with a small longitudinally extending hole or passage 33 which in turn communicates with a diametrically extending groove 34 formed in the outer end of the chuck pin. The diameter of the hole 33 is sufficiently small to allow only a small volume of air to pass therethrough in a given time period and which volume is so small as to obviate any likelihood of overinflating a bicycle tire, air cushion or other inflatable container adapted to be inflated only to relatively low pressures.

It will be understood that in using the inflating gun the chuck 11 is applied to the valve stem of the bicycle tire, air cushion or other inflatable container until the outer end of such stem has sealing contact with the chuck gasket 30, at which time the outer end of the pin 29 of the chuck will have engaged the valve pin in the stem and unseated the valve. When this condition has taken place the operator then squeezes the inflating gun and the air line chuck 13 together from the position of Fig. 2 to the position of Fig. 3 as previously explained, whereupon the compressed air from the air line flows through the passages 16 and 17 in the gun and into the bore 26 in the gun chuck 11 from whence it flows through the passage 27, bore 32 and small hole 33 into the valve stem of the bicycle tire, air cushion and other inflatable container. However, the volume of air flowing into such inflatable container is so small as to enable the user of the air gun to properly inflate the container without the likelihood of overinflating the same with the possible resultant damage to the container.

It will be understood that where such containers as bicycle tires, air cushions and the like are inflated by direct application of the air line chuck 13 to the valve stem of the container, the volume of air entering the container is so great that almost instantly the container is over-inflated.

It will be seen that an inflating gun embodying the invention can be kept at service stations, garages and similar places for the convenience of customers who wish to inflate bicycle tires, air cushions and other similar inflatable containers and can be readily applied to the usual air line and air line chuck and after the user has completed the inflating operation can be quickly and easily detached from the air line and air line chuck.

Although a preferred embodiment of the invention has been illustrated and described herein it will be understood that the invention is susceptible of various modifications and adaptations within the scope of the appended claims.

Having thus described my invention, I claim:

1. In combination with an air chuck of an air line and having a normally seated valve, an inflating gun comprising a body having a passage therethrough and a tubular extension adapted to place said passage in communication with the air line chuck, an attaching member for the gun formed of spring material and having an angularly disposed rearwardly extending portion and a portion extending rearwardly from said first portion substantially parallel to and embracing the air line rearwardly of the chuck, the spring material of the attaching member and angularly disposed portion thereof acting to normally maintain the gun in position with respect to the air line chuck such that the chuck valve remains seated except when the gun and chuck are pressed toward each other, and an inflating chuck mounted on said gun and in communication with said passage and having therein a chuck pin provided with a bore communicating with the interior of the inflating chuck and with an outlet opening communicating with said bore and of predetermined small size and capacity, wherefore when said inflating chuck is applied to the valve stem of an inflatable container only a small volume of air can pass from the chuck into the container in a given time period.

2. An inflating gun comprising a body having a passage therethrough and a tubular extension adapted to place said passage in communication with the chuck of an air line, an attaching member for the gun formed of spring material and having extending portions angularly disposed with respect to each other and adapted to connect the gun to an air line, the spring material of the attaching member and the angularity between the portions thereof being adapted to normally maintain the gun when attached to an air line in position with respect to the air line chuck such that the chuck valve remains seated except when the gun and chuck are pressed toward each other, and an inflating chuck mounted on said gun and in communication with said passage and having therein a chuck pin provided with a bore communicating with the interior of the inflating chuck and with an outlet opening communicating with said bore and of predetermined small size and capacity wherefore when said inflating chuck is applied to the valve stem of an inflatable container only a small volume of air can pass from the chuck into the container in a given time period.

JAMES H. MARCUM.

REFERENCES CITED

The following references are of record in the file of this patent:

UNITED STATES PATENTS

| Number | Name | Date |
| --- | --- | --- |
| 1,522,369 | Jaden | Jan. 6, 1925 |
| 1,558,680 | Kraft | Oct. 27, 1925 |
| 1,948,852 | Gilfoy | Feb. 27, 1934 |
| 1,982,519 | Jaden et al. | Nov. 27, 1934 |
| 2,124,937 | Whittle | July 26, 1938 |
| 2,419,720 | Knight et al. | Apr. 29, 1947 |